US006903831B1

(12) United States Patent
Rapke-Kraft et al.

(10) Patent No.: US 6,903,831 B1
(45) Date of Patent: Jun. 7, 2005

(54) OPERATING SYSTEM FOR A PRINTING MACHINE, AND METHOD OF UPDATING THE OPERATING SYSTEM

(75) Inventors: Petra Rapke-Kraft, Wiesloch (DE); Tilo Löffler, Oftersheim (DE); Gunter Meier, Karlsruhe (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 941 days.

(21) Appl. No.: 09/711,869

(22) Filed: Nov. 13, 2000

(30) Foreign Application Priority Data

Nov. 12, 1999 (DE) ........................................ 199 54 743

(51) Int. Cl.$^7$ ................................................ G06F 11/00

(52) U.S. Cl. .............................. 358/1.13; 399/8; 399/9; 399/12; 399/24

(58) Field of Search ................. 358/1.1–1.9, 1.11–1.18; 399/8, 9, 12, 24

(56) References Cited

U.S. PATENT DOCUMENTS

| | | | | | |
|---|---|---|---|---|---|
| 4,851,875 | A | * | 7/1989 | Tanimoto | 399/24 |
| 4,870,459 | A | * | 9/1989 | Ito et al. | 399/10 |
| 5,101,233 | A | * | 3/1992 | Ito et al. | 399/24 |
| 5,200,779 | A | * | 4/1993 | Nawata | 399/24 |
| 5,216,464 | A | * | 6/1993 | Kotani et al. | 399/24 |
| 5,517,282 | A | * | 5/1996 | Yamashita et al. | 399/10 |
| 5,673,190 | A | * | 9/1997 | Kahleck et al. | 700/2 |
| 5,800,081 | A | * | 9/1998 | Teradaira et al. | 400/74 |
| 6,798,997 | B1 | * | 9/2004 | Hayward et al. | 399/12 |

* cited by examiner

*Primary Examiner*—King Y. Poon
(74) *Attorney, Agent, or Firm*—Laurence A. Greenberg; Werner H. Stemer; Ralph E. Locher

(57) ABSTRACT

An operating system for a printing machine includes a graphic operating interface for allowing the printing machine to be controlled by actions of an operator. Electronic documentation is selectively displayable on the operating interface as a result of actions by the operator. The electronic documentation includes operating instructions, a spare-parts catalog containing numbers and drawings of spare parts, and maintenance instructions. The operating system also includes a list with links between electronic addresses of electronic components in the printing machine and the spare-parts numbers and/or drawings. When the operating system receives a report of a fault in an electronic component through the electronic address thereof, it refers to the fault on the operating interface and, in response to an action by the operator, displays the associated spare-parts numbers and/or drawings on the operating interface. A method of updating the operating system is also disclosed.

13 Claims, 4 Drawing Sheets

OPERATING SYSTEM FOR A PRINTING MACHINE, AND METHOD OF UPDATING THE OPERATING SYSTEM

BACKGROUND OF THE INVENTION

Field of the Invention

The invention relates to an operating system for a printing machine and to a method of updating the operating system.

There are printing machines with a graphic operating interface which permit the printing machines to be controlled by actions made by the operator of the printing machine in the context of the operating interface. The graphic operating interface is, for example, a screen, on which switching areas, symbols and the like are displayed, which can correspond to conventional operating elements. If the screen is a touch-sensitive screen, the operator can actuate a switching area by touching the screen at the corresponding point. In other cases, some kind of pointing instrument, for example a mouse, is used, with which one positions a cursor on the screen and operates a mouse key in order to select the desired function.

In addition, for the purpose of operating and maintaining machines or plants, electronic documentation, software with texts, drawings and databases, which can be viewed and operated on a computer, has become known heretofore. Electronic documentation, which, among other things, includes spare-parts lists and drawings and maintenance diagrams and also assists the analysis of faults and the ordering of spare parts, is described, for example, in the publication *Technische Dokumentation* [Technical documentation], 1998, volume 12, pages 4 to 9. This publication also describes how necessary spare parts are entered into a requirements list, how orders can be printed and how attempts are made to link the documentation program with electronic fault reporting systems.

SUMMARY OF THE INVENTION

It is an object of the invention to integrate electronic documentation into the operating interface of a printing machine in such a way that it is made easily possible for the documentation to react to electronic fault messages from the printing machine. In addition, it is a further object of the invention to provide a method of updating the operating system which, in the event of conversion work on the printing machine, permits a rapid and simple updating of the operating system to the changed constructional state of the printing machine.

With the foregoing and other objects in view, there is provided, in accordance with one aspect of the invention, an operating system for a printing machine, comprising a graphic operating interface for allowing the printing machine to be controlled by actions made by an operator of the printing machine in the context of the operating interface, and electronic documentation selectively displayable on the operating interface as a result of actions by the operator in the context of the operating interface, the electronic documentation including operating instructions for the printing machine, a spare-parts catalog for the printing machine, containing numbers and drawings of spare parts, and maintenance instructions for the printing machine, the operating system also comprising a list with links between electronic addresses of electronic components in the printing machine and at least one of the spare-parts numbers and the spare-parts drawings, respectively, and when the operating system receives a report of a fault in an electronic component, the electronic address of which is specified, being capable of referring to the fault on the operating interface and, in response to an action by the operator, of displaying at least one of the associated spare-parts numbers and spare-parts drawings, respectively, on the operating interface.

In accordance with another feature of the invention, in the event of a fault, the operator is able to call up a program to eliminate the fault.

In accordance with a further feature of the invention, the operating system includes being capable of establishing a telecommunication link to a remote service system when the fault elimination program is one of called up and executed, respectively.

In accordance with an added feature of the invention, the operating system includes being capable of monitoring maintenance intervals one of the printing machine and parts thereof, respectively, and referring the operator to due maintenance by displaying at least one appropriate symbol on the operating interface.

In accordance with an additional feature of the invention, the operating system includes being capable of displaying maintenance information which becomes more detailed step by step, in response to actions by the operator in the context of a symbol referring to due maintenance.

In accordance with yet another feature of the invention, the operating system includes, in response to an action by the operator in the context of a further symbol which is displayed when maintenance is due, being capable of resetting the maintenance message so that it reappears after a predetermined operating interval.

In accordance with yet a further feature of the invention, the operating system includes, in response to an action by the operator in the context of a further symbol which is displayed when maintenance is due, being capable of displaying a control list on the operating interface wherein confirmation of maintenance work which has been performed is requested.

In accordance with yet an added feature of the invention, the operating system includes being capable of transmitting the confirmation of maintenance work in the control list to a remote service system by a telecommunication link which is established as required.

In accordance with yet an additional feature of the invention, the operating system includes a machine history maintained by at least one of the operating system and the remote service system, respectively.

In accordance with still another feature of the invention, the operating system includes a display by the operating interface of a schematic picture of one of the printing machine and at least one of the parts thereof, respectively, and appropriate parts of the electronic documentation being displayed on the operating interface in response to actions by the operator of the printing machine in the context of the schematic picture.

In accordance with another aspect of the invention, there is provided a method of updating an operating system for a printing machine, which has a graphic operating interface for allowing the printing machine to be controlled by actions made by an operator of the printing machine in the context of the operating interface, and which has electronic documentation which, as a result of actions by the operator in the context of the operating interface, is displayed selectively on the operating interface, the electronic documentation including operating instructions for the printing machine, a spare-part catalog for the printing machine and maintenance instructions for the printing machine, the method which comprises, after conversion work performed on the printing machine, establishing a telecommunication link to a remote service system, for recording the conversion work which has been performed, compiling one of supplementary and updated electronic documentation, respectively, and one of supplementing the original electronic documentation by the supplementary documentation and replacing the original electronic documentation by the updated documentation, respectively.

In accordance with a concomitant mode, the method includes providing the remote service system with access to a database containing all the data necessary for compiling documentation for any desired machine configurations.

A special feature of the operating system according to the invention is that a list with links between electronic addresses of electronic components in the printing machine and spare-parts numbers and/or spare-parts drawings is included and, when the operating system receives a report of a fault in an electronic component, specifying its electronic address, it refers to the fault on the operating interface and, in response to an action by the operator, displays the associated spare-parts number(s) and/or spare-parts drawing (s) on the operating interface. This means that fault messages are linked in a unique way with the spare-parts catalog, which permits a particularly rapid and specific reaction to the fault message. As a result of the concrete display of the defective components and the measures to be taken, machine downtimes are reduced.

In order to equip a printing machine with the operating system according to the invention, it is unnecessary to make any changes to mechanical or electronic components. Instead, the usual hexadecimal codes with which electronic components in the printing machine are usually identified can be maintained unchanged, because the operating system automatically links them with the usual item numbers in the spare-parts catalog.

Electronic components in the printing machine which can output fault messages are, for example, sensors which monitor operating states of the printing machine, electronic subassemblies which control or regulate mechanical or electronic components, stepping motors and so forth. Fault messages from the electronic components make is possible not only to detect faults in these components themselves but also to detect faults, for example in mechanical components, in that there is taken into account, for example, the experience that a specific fault message or combination of fault messages generally has a specific mechanical cause. Experiences of this type are allowed to be incorporated in the link list between addresses of electronic components and spare-parts numbers or drawings, so that the operator can identify the cause of a fault as quickly as possible and can take necessary measures.

As a result of the integrated operating instructions, the operator is at all times given extensive help relating to the functions of the printing machine selected by him or her.

In a preferred embodiment, the action of performing necessary measures in the event of a fault is made easier by the fact that the operator, in the event of a fault, calls up a program to eliminate the fault, which can establish a telecommunication link with a remote service system. Such a service system is operated by the manufacturer of the printing machine, for example, so as, if necessary, to be able to provide the required spare parts immediately and to be able to initiate a service operation for eliminating the fault.

The operating system and/or the service system can also maintain a machine history, which can be evaluated in order to initiate the optimum measures and wherein the reported faults can be recorded.

In a preferred embodiment, the operating system monitors maintenance intervals of the printing machine or of parts of the printing machine, and refers the operator to due maintenance by displaying one or more appropriate symbols on the operating interface. By touching or clicking on such a symbol on the screen, the operator downloads maintenance instructions for the printing machine onto the screen, preferably initially brief instructions, from which he can get to more detailed maintenance information if necessary. If the maintenance is not to be performed immediately, for any reasons, the operator can reset the maintenance message, with the operating system reminding the operator about the maintenance after a predetermined operating interval. In addition, the operator can be requested to call up and edit a control list, wherein the implementation of maintenance work by the operator has to be confirmed. Confirmation of maintenance work can be communicated to a remote service system by a telecommunication link.

As a result of maintenance measures which can be performed correctly in good time, and because of the documentation which can be called up, printing quality and service time of the printing machine are maintained continuously at a high level.

The operating interface can display a schematic picture of the printing machine or parts thereof, appropriate parts of the electronic documentation being displayed on the operating interface in response to actions by the operator of the printing machine in the context of the schematic picture. In view of the operating instructions, this means that an appropriate part of the documentation is displayed on the operating interface as on-line help if the operator points to any location on the schematic picture. Alternatively, the on-line help can be called up via a list of contents. If a fault is detected, the location of the fault can be displayed automatically on the schematic picture, for example by emphasis through color, sound or other emphasis. Under certain circumstances, the operator knows immediately what kind of fault this is. Otherwise, he can point to the marked location in order, for example, to cause the appropriate drawing from the spare-parts catalog to be displayed.

In the method for updating the operating system, following retrofitting or improvement work on the printing machine, the remote service system preferably has access to a database which contains all the data which is needed to compile documentation for any desired machine configurations. A database of this type, which is also referred to as a publishing system, is provided in any case by the printing-machine manufacturer and is always kept up to date. Using the publishing system, the new operating system can be compiled reliably and in good time in agreement with the current structural state. As a result, even in the event of changes to the machine state because of improvement work or retrofitting work, correct, comprehensive and complete documentation is available at all times.

Other features which are considered as characteristic for the invention are set forth in the appended claims.

Although the invention is illustrated and described herein as embodied in an operating system for a printing machine, and a method of updating the operating system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

DESCRIPTION OF THE PREFERRED EMBODIMENTS

Figure 1:
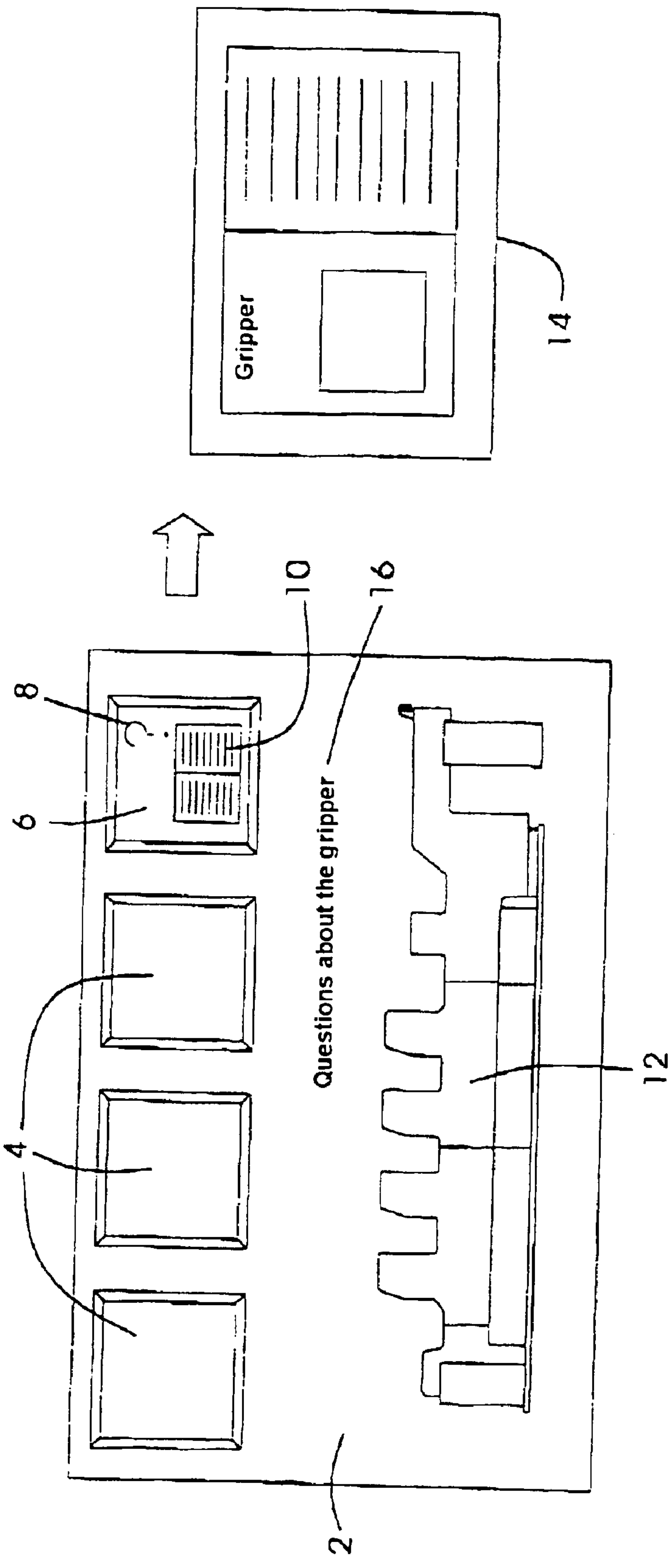
FIG. 1 is a sketch explaining the operating principle of the operating system according to the invention, as operating instructions.

Referring now to the drawings and, first, particularly to FIG. 1 thereof, there is shown therein, diagrammatically, an operating interface 2 of a printing machine. The operating interface 2 is, for example, a touch-sensitive screen, on which switching areas, symbols, text and pictures can be displayed. In the example, three switching areas 4 are shown which, for example, correspond to conventional push buttons for operating the printing machine and which an operator can operate by touching the operating interface 2 at an appropriate point. In addition, the operating interface 2 is provided with a switching area 6 having a "?" symbol 8 and a symbol 10 for electronic documentation, which is integrated into the operating interface 2, i.e., into the software which generates the operating interface 2.

The electronic documentation includes operating instructions, which appear when the operator touches the symbol 8. For example, initially, a list of contents appears, from which the operator can select subjects about which he needs explanations. Additionally or alternatively, when the symbol 8 is touched, a schematic overview 12 of the printing machine can appear on the operating interface 2. In the overview 12, the operator can indicate any region of the printing machine, in relation to which the appropriate section from the operating instructions then appears immediately on the screen, in the example a section labeled "Gripper", which includes a drawing and text and is displayed in a window 14 on the operating interface 2. In FIG. 1, the window 14 is shown diagrammatically beside the operating interface 2, which assumes an appropriate size of the screen. If the entire screen area is used for the operating interface 2, the window 14 can cover the operating interface 2 wholly or partly, or a separate screen is used for the window 14.

In order to make the selection of a subject even easier for the operator, a short text 16 can appear on the overview 12 while the operator touches the overview 12 lightly at any location. The text 16 gives the operator feedback as to which questions will be answered at the location just selected, as soon as the finger pressure of the operator is increased.

In the selected section of the operating instructions, the operator can navigate in a conventional manner, for example by scroll bars on the window 14. The operating instructions can contain marked passages, so-called hyperlinks, via which one gains access to further information, which can be found at any location in the documentation.

The described help function, which sets up a context-sensitive connection to operating instructions, is referred to as a context-sensitive help function.

Figure 2:
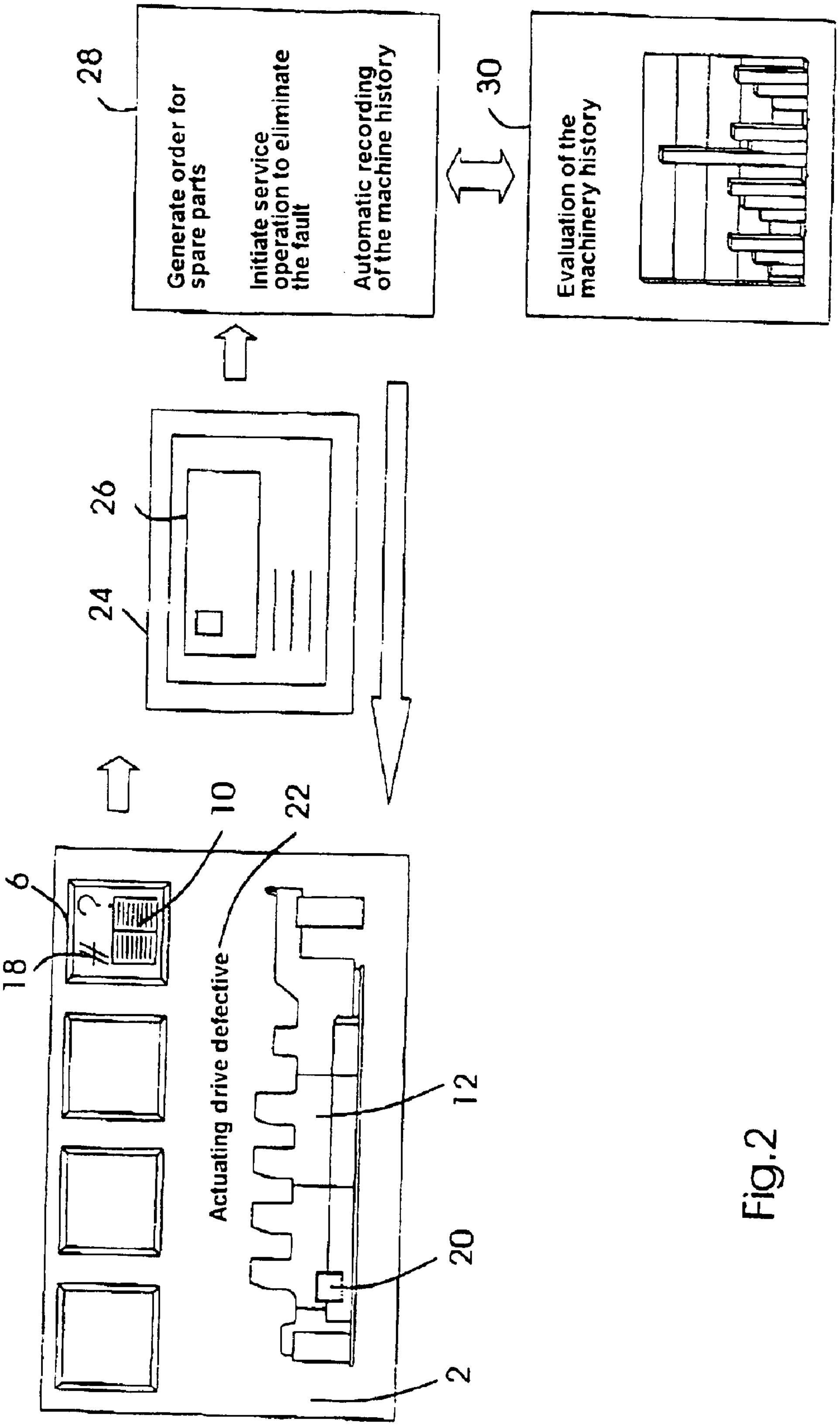
FIG. 2 is a sketch explaining the operating principle of the operating system as a spare-parts catalogue.

FIG. 2 shows, in schematic form, the same operating interface 2 as in FIG. 1, whereon, in addition, a "#" symbol 18 appears in the switch area 6. The symbol 18 notifies the operator that there is a fault somewhere in the printing machine. In addition, a frame 20 appears in the overview 12, which makes it possible for the operator to localize the fault quickly.

A fault message is generated as follows. Electronic components or subassemblies, respectively, in the printing machine have unique electronic addresses, generally in the form of hexadecimal codes. An electronic component which becomes defective, or a sensor for monitoring a specific operating state, which detects a fault, transmits the electronic address thereof.

The electronic documentation of the operating system includes a spare-part catalog for the printing machine, which includes spare-part numbers and spare-part drawings. In addition, the operating system contains a list with links between electronic addresses of electronic components and numbers of spare parts.

If, as a consequence of a fault, the operating system receives one or more electronic addresses, it then selects from the link list one or more numbers of spare parts belonging to components which are defective or are probably defective, and displays the location of the components on the overview 12. In addition, it can insert a short text 22 on the overview 12 on the operating interface 2, the text 22 indicating the type of fault, for example "Actuating drive defective". In FIG. 2, the frame 20 marks the location of the defective actuating drive in the printing machine.

If the operator points to the symbol 12 or the frame 20, a section of the electronic documentation is displayed in a window 24 of the operating interface 2, the window 24 containing a drawing 26 and associated text. In the drawing 26 which, in the example, is an exploded drawing of the actuating drive of the printing machine, the defective component is automatically emphasized, for example by being made to flash.

If the operator points to the flashing defective component, a program for eliminating the fault is called up and a telecommunication link is established to a remote service system. If the service system is operated by the manufacturer of the printing machine, the necessary spare parts can be ordered immediately on line and, if necessary, customer service can be requested to eliminate the fault, as illustrated diagrammatically in a block 28 in FIG. 2. The operating system and/or the service system can additionally maintain a machine history, which can be evaluated to initiate the optimal measures and in which reported faults can be recorded, as illustrated diagrammatically in a block 30 in FIG. 2.

The help function described with reference to FIG. 2, using data supplied by the printing machine, therefore represents a context-sensitive connection to a spare-parts catalog.

The printing machine additionally includes a totalizer, i.e., a counter for the number of prints. When a specific counter reading is reached, for example 10,000,000 prints, as shown diagrammatically in the overview 32 of the printing machine in FIG. 3, the operating system causes a window 34 to appear on the operating interface 2, for example containing a flashing symbol 36 which refers the operator to the maintenance that is due. If the operator points to the symbol 36 or "clicks" on it, initially brief information appears in a window 38 to the effect that maintenance is due at 10,000,000 prints and, in addition, a symbol 40, via which the printer can open a further window 42 if necessary, wherein extensive maintenance instructions can be seen.

The window 34 also includes a symbol 44, with which the operator can reset the maintenance message, the operating system storing a reminder algorithm by which the operator is automatically reminded of the maintenance after a specific number of further prints.

The windows 34, 38 and 42, respectively, additionally contain a symbol 46, via which the operator can cause an electronic control list 48 to be displayed on the operating interface, wherein maintenance work that has been performed is to be confirmed. The data from the control list is additionally recorded in a diagrammatically illustrated machine history 50, the data of which can also be used conversely for the maintenance measures to be performed. Between the operating system of the printing machine, which maintains the electronic control list 48, and a remote service system, which maintains the machine history 30, it is possible, for example, for a telecommunication link 50 to be established.

Figure 3:
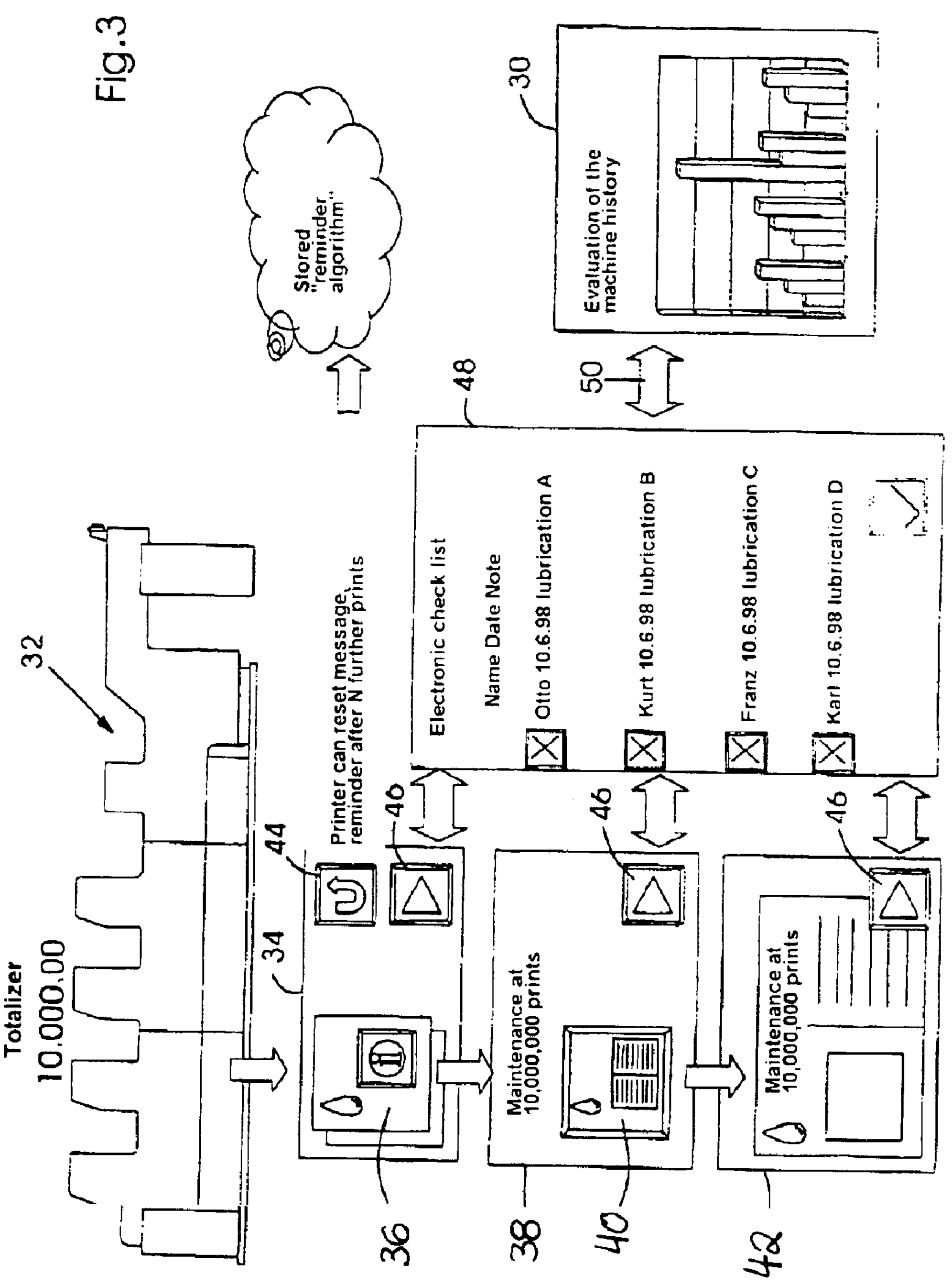
FIG. 3 is a sketch explaining the operating principle of the operating system as maintenance instructions.

The help function described with reference to FIG. 3, using data furnished by the printing machine, therefore supplies a context-sensitive connection to maintenance instructions.

Figure 4:
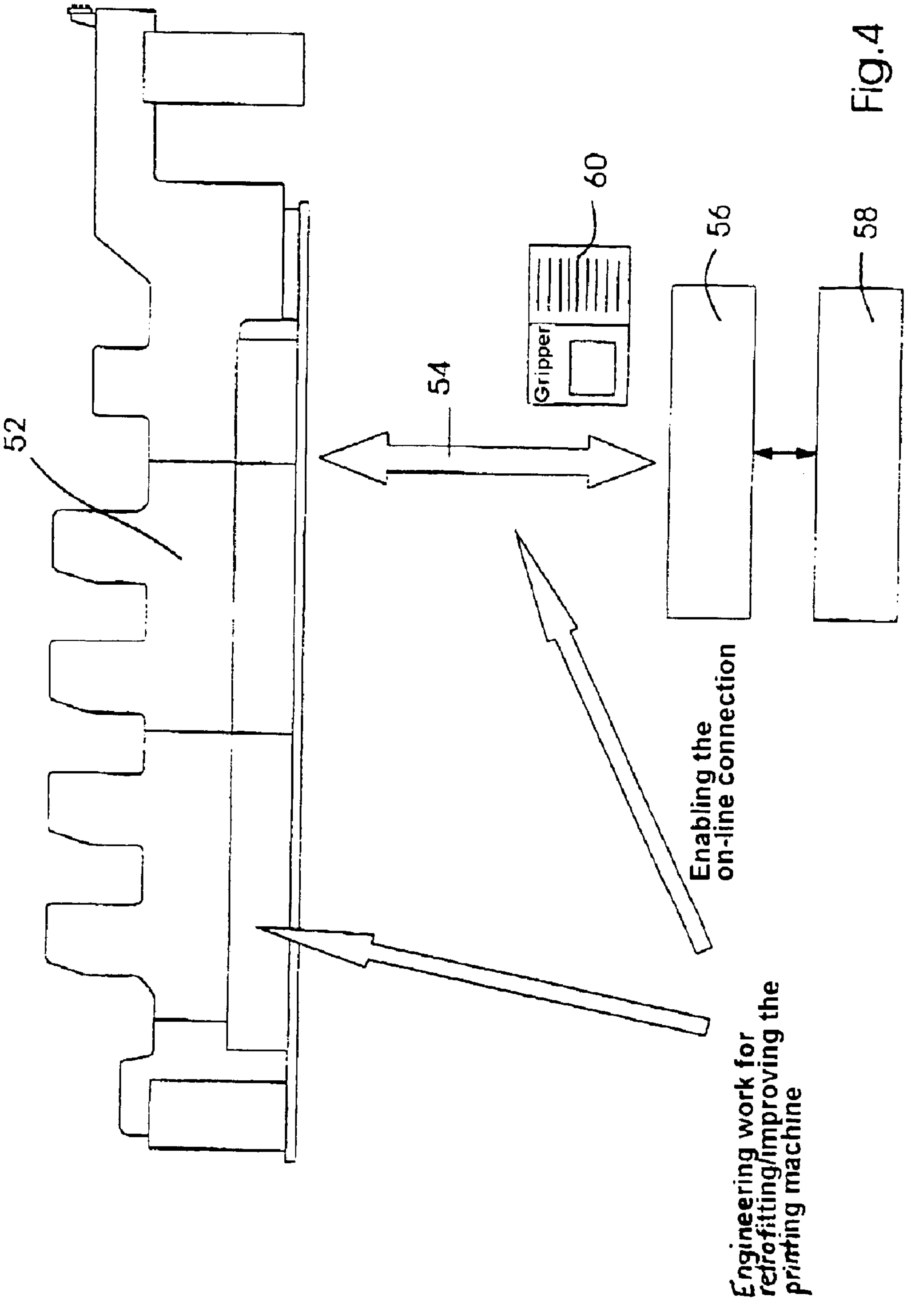
FIG. 4 is a sketch explaining the method according to the invention for updating the operating system.

FIG. 4 illustrates diagrammatically the manner in which the aforedescribed operating system is updated when an engineer has performed conversion work for the purpose of improving or retrofitting the printing machine 52, for example, has installed a lengthened delivery or an additional drying device.

Following the installation work, the engineer establishes a telecommunication link 54, for example via the Internet, between the printing machine 52 and a remote service system 56. The service system 56, for example a central server at the manufacturer of the printing machine, has access, for example via an Intranet within the company, to a so-called publishing system 58, a database which contains all the data necessary for compiling documentation for any desired machine configurations.

The service system 56 acquires for itself, automatically or with the cooperation of the engineer, all the data from the printing machine 52, for example, the build number of the printing machine and the item numbers of the changed and supplemented subassemblies, respectively, which are required for compiling up-to-date documentation, including operating instructions, a spare-parts catalog and maintenance instructions, and compiles supplementary or updated electronic documentation 60, which is then transmitted via the telecommunication link 54 to the printing machine 52 or the operating system thereof, in order to supplement or replace the original electronic documentation.

The context-sensitive help shown in FIG. 4, in the event of changes in the structural state of the printing machine, allows the electronic documentation of the operating system to be brought quickly and reliably into precise agreement with the current structural state of the printing machine.

We claim:

1. An operating system for a printing machine, comprising:

a graphic operating interface for allowing the printing machine to be controlled by actions made by an operator of the printing machine in the context of the operating interface;

electronic documentation selectively displayable on the operating interface as a result of actions by the operator in the context of the operating interface, said electronic documentation including operating instructions for the printing machine, a spare-parts catalog for the printing machine containing numbers and drawings of spare parts, and maintenance instructions for the printing machine; and a list with links between electronic addresses of electronic components in the printing machine and said spare-parts numbers and/or said spare-parts drawings, respectively;

the operating system, upon receiving a report of a fault in an electronic component through the electronic address of the electronic component, referring to the fault on the operating interface and, in response to an action by the operator, displaying at least one of the associated spare-parts numbers and spare-parts drawings, respectively, on the operating interface.

2. The operating system according to claim 1, wherein, in the event of a fault, the operator is able to call up a program to eliminate the fault.

3. The operating system according to claim 2, which includes a telecommunication link to a remote service system being established when the fault elimination program is called up or executed.

4. The operating system according to claim 1, wherein the operating system monitors maintenance intervals of the printing machine or parts, and refers the operator to due maintenance by displaying at least one appropriate symbol on the operating interface.

5. The operating system according to claim 4, wherein maintenance information which becomes more detailed step by step, in response to actions by the operator in the context of a symbol referring to due maintenance, is displayed.

6. The operating system according to claim 5, wherein, in response to an action by the operator in the context of a further symbol which is displayed when maintenance is due, the maintenance message is reset so that it reappears after a predetermined operating interval.

7. The operating system according to claim 5, wherein, in response to an action by the operator in the context of a further symbol which is displayed when maintenance is due, a control list is displayed on the operating interface wherein confirmation of maintenance work which has been performed is requested.

8. The operating system according to claim 7, wherein said confirmation of maintenance work in said control list is transmitted to a remote service system by a telecommunication link which is established as required.

9. The operating system according to claim 3, including a machine history maintained by the operating system and/or said remote service system.

10. The operating system according to claim 8, including a machine history maintained by the operating system and/or said remote service system.

11. The operating system according to claim 1, including a display by the operating interface of a schematic picture of one of the printing machine and at least one of the parts thereof, respectively, and appropriate parts of the electronic documentation being displayed on the operating interface in response to actions by the operator of the printing machine in the context of the schematic picture.

12. A method of updating an operating system for a printing machine according to claim 1, the method which comprises:

after conversion work performed on the printing machine, establishing a telecommunication link to a remote service system, for recording the conversion work which has been performed;

compiling supplementary or updated electronic documentation; and supplementing the original electronic documentation by the supplementary documentation or replacing the original electronic documentation by the updated documentation.

13. The method according to claim 12, which includes providing the remote service system with access to a database containing all the data necessary for compiling documentation for any desired machine configurations.

* * * * *